US012714283B2

(12) United States Patent
Hwang et al.

(10) Patent No.: US 12,714,283 B2
(45) Date of Patent: Aug. 25, 2026

(54) MOBILE TERMINAL AND SYSTEM

(71) Applicant: LG Electronics Inc., Seoul (KR)

(72) Inventors: Sungmok Hwang, Seoul (KR); Sangyun Kim, Seoul (KR); Jinok Kim, Seoul (KR); Yeonkyung Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/294,452

(22) PCT Filed: Sep. 14, 2021

(86) PCT No.: PCT/KR2021/012465
§ 371 (c)(1),
(2) Date: Feb. 1, 2024

(87) PCT Pub. No.: WO2023/038175
PCT Pub. Date: Mar. 16, 2023

(65) Prior Publication Data

US 2024/0335083 A1 Oct. 10, 2024

(30) Foreign Application Priority Data

Sep. 13, 2021 (KR) ........................ 10-2021-0121573

(51) Int. Cl.
*A47L 15/00* (2006.01)
*A47L 15/42* (2006.01)
(Continued)

(52) U.S. Cl.
CPC ....... *A47L 15/0063* (2013.01); *A47L 15/4295* (2013.01); *H04L 67/12* (2013.01); *H04M 1/72415* (2021.01)

(58) Field of Classification Search
None
See application file for complete search history.

(56) References Cited

U.S. PATENT DOCUMENTS 7,524,380 B1 * 4/2009 Duri .................... A47L 15/0047 134/25.2
2018/0214001 A1 * 8/2018 Wöbkemeier ....... A47L 15/4295
(Continued)

FOREIGN PATENT DOCUMENTS

DE 3816408 A1 * 11/1989 ......... A47L 15/4282
DE 102019108395 A1 10/2019
(Continued)

OTHER PUBLICATIONS

Machine translation: DE-3816408-A1; Stamminger et al. (Year: 1989).*

(Continued)

*Primary Examiner* — Natasha N Campbell
(74) *Attorney, Agent, or Firm* — Fish & Richardson P.C.

(57) ABSTRACT

A mobile terminal includes: a display, a camera, and a processor. The processor is configured to execute instructions to perform operations comprising: obtaining, through the camera, an image of an inside of a dishwasher, transmitting, to a server, the obtained image, receiving, from the server, object information in response to the transmitted image, and controlling the display to display washing guide information regarding the dishwasher based on the received object information, where the object information includes at least one of a type of one or more objects, an amount of the one or more objects, a position of the one or more objects, a posture of the one or more objects, a material of the one or more objects, or a mask ratio indicating a ratio of the one or more objects to a total area of the image.

18 Claims, 14 Drawing Sheets

(51) Int. Cl.

| | |
|---|---|
| ***H04L 67/12*** | (2022.01) |
| ***H04M 1/72415*** | (2021.01) |

(56) References Cited

U.S. PATENT DOCUMENTS

| | | | | |
|---|---|---|---|---|
| 2020/0221166 | A1* | 7/2020 | Park | H04N 21/4318 |
| 2021/0127943 | A1* | 5/2021 | Ha | A47L 15/4297 |
| 2021/0148034 | A1* | 5/2021 | Park | G06V 20/00 |
| 2021/0198828 | A1 | 7/2021 | Rosenbauer et al. | |
| 2021/0352357 | A1 | 11/2021 | Park et al. | |
| 2022/0257085 | A1* | 8/2022 | Ohayon | A47L 15/0044 |
| 2023/0012891 | A1 | 1/2023 | Alemany et al. | |
| 2023/0055281 | A1 | 2/2023 | Park et al. | |
| 2024/0040183 | A1 | 2/2024 | Park et al. | |

FOREIGN PATENT DOCUMENTS

| | | | |
|---|---|---|---|
| DE | 102020202501 | A1 | 9/2021 |
| JP | 2004-275267 | | 10/2004 |
| JP | 2006-087674 | | 4/2006 |
| KR | 102119076 | | 6/2020 |
| KR | 10-2021-0044148 | A | 4/2021 |
| KR | 10-20210039026 | | 4/2021 |
| KR | 10-20210088327 | | 7/2021 |
| WO | 2018/103958 | A1 | 6/2018 |

OTHER PUBLICATIONS

Extended European Search Report in European Appln. No. 21956880.5, mailed on Aug. 25, 2025, 12 pages.

* cited by examiner

COURSE AND FEATURE DESCRIPPTION

| COURSE DESCRIPTION | |
|---|---|
| SOAKING | SOAKING DIRTY DISHES AND THEN WASHING |
| STRONG | WASHING OF GREASY TABLEWARE |
| STANDARD | WASHING AFTER NORMAL MEAL |
| DELICATE | WASHING LIGHTLY SOILED TABLEWARE |
| RAPID | WASHING SLIGHTLY DIRTY DISHES, CUPS, OR THE LIKE (NO DRYING) |
| SIMPLIFIED | RINSING SMALL AMOUNT OF TABLEWAR (NO DRYING) |

FIG. 17B

Scene0. WE RECOMMEND STANDARD COURSE.
Scene1. AS FRYING PAN MAY BE DAMAGED, WE RECOMMEND REMOVING FRYING PAN AND USING SMALL WASHIG COURSE.
Scene2. SINCE THERE IS LADLE, WE RECOMMEND SOAKING COURSE BECAUSE OF STICKINESS.
Scene3. PLEASE REMOVE PLASTIC CUP AND SINCE THERE IS LADLE, WE RECOMMEND SOAKING COURSE BECAUSE OF STICKINESS.
Scene4. SINCE THERE ARE PLASTIC CUPS, WE RECOMMEND LOW-TEMPERATURE WASHING COURSE.
Scene5. PLEASE REMOVE FRYING PAN AS FRYING PAN MAY BE DAMAGED, AND THERE IS PLASTIC CUP, WE RECOMMEND LOW-TEMPERATURE WASHING COURSE.
Scene6. PLEASE REMOVE FRYING PAN AS FRYING PAN MAY BE DAMAGED, AND THERE IS LADLE, WE RECOMMEND SOAKING COURSE BECAUSE OF STICKINESS.
Scene7. PLEASE REMOVE PAN AS PAN MAY BE DAMAGED, AND THERE IS LADLE, SO WE RECOMMEND SOAKING COURSE OR STANDARD COURSE. WHICH DO YOU PREFER?

MOBILE TERMINAL AND SYSTEM

CROSS-REFERENCE TO RELATED APPLICATIONS

This application is a National Stage application under 35 U.S.C. § 371 of International Application No. PCT/KR2021/012465, filed on Sep. 14, 2021, which claims the benefit of Korean Patent Application No. 10-2021-0121573, filed on Sep. 13, 2021. The disclosures of the prior applications are incorporated by reference in their entirety.

TECHNICAL FIELD

The present disclosure relates to maintenance of a dishwasher.

BACKGROUND ART

A dishwasher is a device that uses washing water to clean dirt on the surfaces of tableware, cooking utensils, or the like.

Generally, the dishwasher may include a tub in which a washing chamber is formed, a spray nozzle which sprays high-pressure washing water into the washing chamber, a shelf which seats tableware inside the tub, and a door rotatably coupled to the tub to open and close the washing chamber.

However, in a conventional dishwasher, the amount of detergent and washing course were determined based on the user's passive actions, regardless of the type, material, amount, posture, or the like of the tableware.

Accordingly, there was a problem in which the tableware was not washed properly. In addition, tableware that could not be washed was stored, and there was a risk that the tableware could be damaged.

DISCLOSURE

Technical Problem

An object of the present disclosure is to be capable of solving the above-mentioned problems.

An object of the present disclosure is to efficiently provide a guide for washing tableware just by taking pictures of the inside of a dishwasher.

An object of the present disclosure is to be capable of guiding the placement of tableware in the washing chamber of the dishwasher.

An object of the present disclosure is to be capable of guiding the storage of tableware that cannot be washed.

An object of the present disclosure is to be capable of recommending the optimal washing amount and washing course.

Technical Solution

A mobile terminal according to an embodiment of the present disclosure may photograph the inside of a dishwasher through a camera, transmit the photographed image to a server, receive dish information from the server, and, based on the received dish information, display washing guide information for the dishwasher on the display unit.

When the posture of the tableware deviates from a preset posture, the mobile terminal according to an embodiment of the present disclosure may output placement guide information including the position of the tableware and text to adjust the disposition of the tableware.

Based on the type of the tableware and the material of the tableware, the mobile terminal according to an embodiment of the present disclosure may output non-storage guide information including the position of the tableware and text indicating that the tableware cannot be washed, if there are tableware that cannot be washed, The mobile terminal according to an embodiment of the present disclosure may determine the amount of detergent to be input and the washing course, and output washing recommendation information including the determined amount of detergent and the washing course.

Advantageous Effect

According to an embodiment of the present disclosure, a user can receive optimal guidance on washing tableware by simply taking pictures of the inside of the dishwasher through a terminal. Accordingly, convenience may be greatly improved.

According to an embodiment of the present disclosure, the dishwasher does not need to be equipped with a separate camera, so the cost of installing the camera may be reduced, and the degree of freedom of components of the dishwasher may be improved.

According to an embodiment of the present disclosure, when a user adjusts the disposition of tableware according to the disposition guide of the dishwasher, the tableware can be washed more efficiently and cleanly.

According to an embodiment of the present disclosure, the user can check which tableware cannot be input in the dishwasher through storage guide information. Accordingly, damage to tableware that cannot be input therein may be prevented in advance.

According to an embodiment of the present disclosure, washing power can be maximized by recommending an appropriate amount of detergent and an appropriate washing course.

DESCRIPTION OF DRAWINGS

FIGS. 17*a* and 17*b* are diagrams illustrating a scenario for preventing damage to tableware and guiding a recommended course according to the type of the tableware.

BEST MODE

Figure 1:
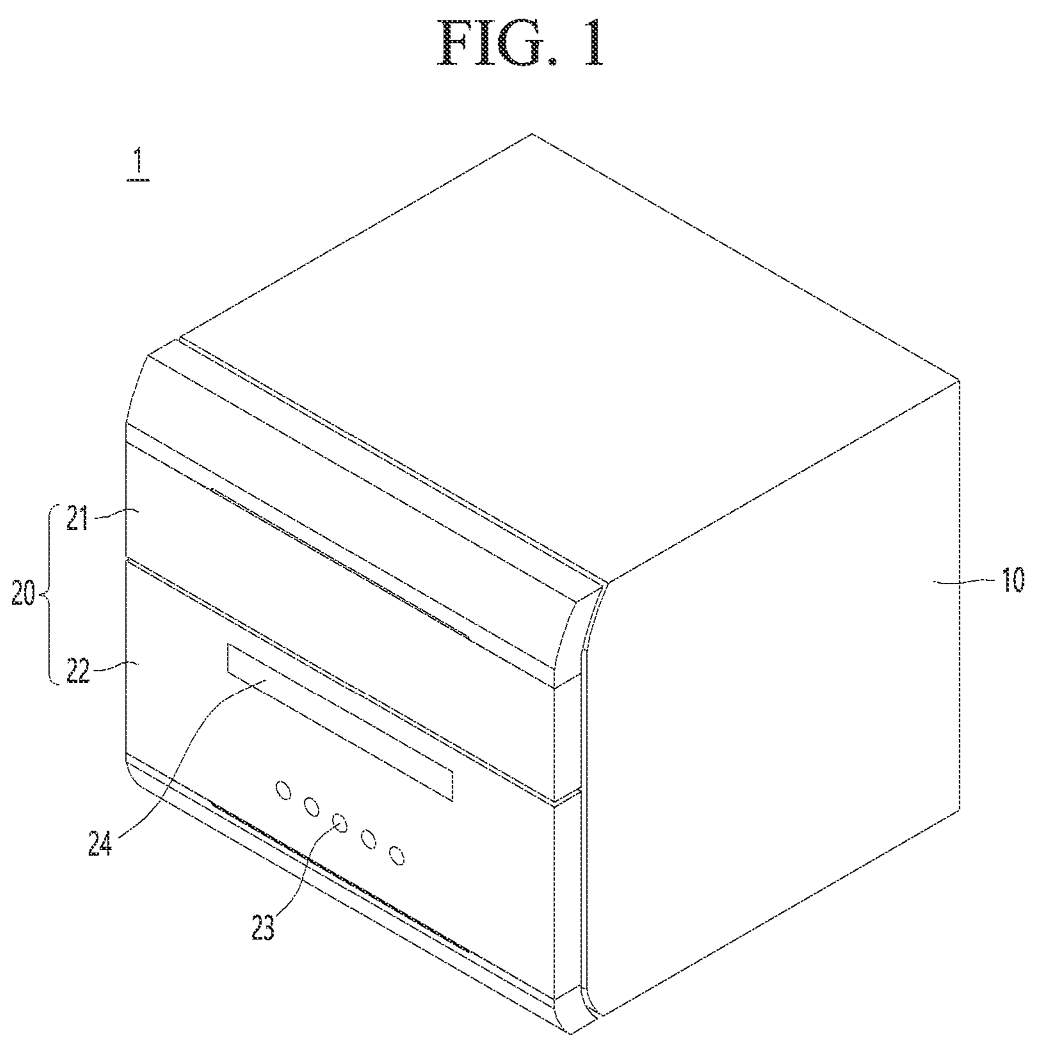
FIG. 1 is a block diagram illustrating a dishwasher according to an embodiment of the present disclosure.

Hereinafter, embodiments disclosed in the present specification will be described in detail with reference to the attached drawings, wherein identical or similar components will be assigned the same reference numbers regardless of reference numerals, and duplicate descriptions thereof will be omitted. The suffixes 'module' and 'part' for components used in the following description are given or used interchangeably only considering the ease of writing the specification, and do not have distinct meanings or roles in themselves. Additionally, in describing the embodiments disclosed in this specification, if it is determined that detailed descriptions of related known technologies may obscure the subject matter of the embodiments disclosed in this specification, the detailed descriptions thereof will be omitted. In addition, it should be understood that the attached drawings are only for easy understanding of the embodiments disclosed in this specification, and the technical idea disclosed in this specification is not limited by the attached drawings, and all changes, equivalents, or substitutes included in the spirit and technical scope of the present disclosure are included.

Terms containing ordinal numbers, such as first and second, may be used to describe various components, but the components are not limited by the terms. The above terms are used only for the purpose of distinguishing one component from another.

When a component is said to be 'connected' or 'joined' to another component, it should be understood that it may be directly connected or joined to the other component, but that other components may exist in between. On the other hand, when a component is mentioned as being 'directly connected' or 'directly joined' to another component, it should be understood that there are no other components in between.

Figure 2:
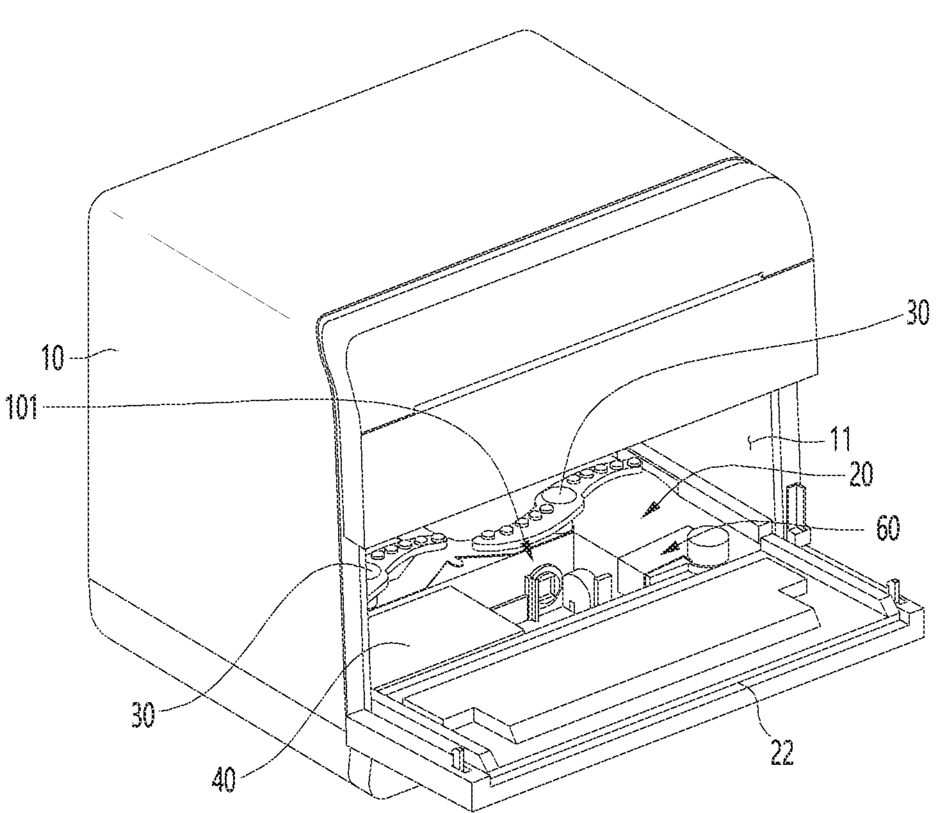
FIG. 2 is a perspective view illustrating a cooking appliance according to an embodiment of the present disclosure.

FIG. 1 is a perspective view illustrating a dishwasher according to an embodiment of the present disclosure, and FIG. 2 is a perspective view illustrating a state where the lower door of the dishwasher according to an embodiment of the present disclosure is opened.

Referring to FIGS. 1 and 2, the dishwasher 1 according to an embodiment of the present disclosure may include a tub 10 forming a washing chamber 11 and a door 20 rotatably coupled to the tub 10.

The tub 10 may form the outer appearance of the dishwasher 1.

In particular, the tub 10 is provided to form a washing chamber 11 therein.

The washing chamber 11 may be a space where washing water is sprayed and thus tableware is washed.

At least one shelf (or rack) on which tableware or the like is placed may be installed in the washing chamber 11. A shelf (not illustrated) can be formed to allow washing water to pass through while tableware or the like are placed on the shelf. For example, the shelf may be formed so that predetermined wires cross each other.

A rail (not illustrated) may be provided on the inner surface of the tub 11 to allow the shelf to move toward the door 20. The shelf may be provided with rollers (not illustrated) supported on the rail.

The outer surface of the tub 10 may form the outer appearance of the dishwasher 1. For example, the tub 10 may have a box shape with an open front surface. In other words, when placed on the floor, the tub 10 may have a rectangular parallelepiped shape with an internal space (or washing chamber) formed thereon.

The door 20 may be rotatably coupled to the tub 10 to open and close the washing chamber 11.

In particular, since the tub 10 is formed so that the front surface is open, the door 20 may be rotatably coupled to the front surface of the tub 10.

The door 20 may be equipped with switches 23 and 24 to guide the user's operation.

The switches 23 and 24 may be configured to be pushable by a user. The switches 23 and 24 may be configured to sense a user's touch input.

For example, the switches 23 and 24 may include a power source that turns the dishwasher 1 on/off or an input button 23 which selects various functions of the dishwasher 1.

The switches 23 and 24 may include a button 24 for opening the door 20.

The door 20 may be provided as a pair of doors that are distinct from each other. In detail, the door 20 may include an upper door 21 and a lower door 22 disposed up and down, respectively.

For example, the upper door 21 and the lower door 22 may have a square plate shape. The upper door 21 and lower door 22 can each rotate from the tub 10.

Additionally, the lower end portion of the upper door 21 and the upper end portion of the lower door 22 may contact each other when the door 20 is closed. At this time, the front surface of the tub 10 may be completely covered by the door 20. According to this, the washing chamber 11 may be closed by the door 20. At this time, the upper door 21 and the lower door 22 may be in close contact with each other to prevent leakage of washing water or the like.

The lower corner of the upper door 21 may be rotated in front of the tub 10 so that the center of rotation is positioned at the upper corner.

The upper corner of the lower door 22 may be rotated in front of the tub 10 so that the center of rotation is positioned at the lower edge.

As the upper door 21 and the lower door 22 rotate, the front surface of the tub 10 may be opened and the washing chamber 11 may be exposed to the outside.

When the washing chamber 11 is exposed to the outside, the user can put tableware into the shelf of the washing chamber 11 or retrieve them.

Meanwhile, the dishwasher 1 may further include a base plate 20 that forms the bottom of the tub 10, and a spray arm (30, or washing wing) that is rotatably coupled to the base plate 20 and sprays washing water toward the washing chamber 11, a supply pump (not illustrated) that supplies washing water to the spray arm 30, a heater assembly 40 that can generate steam by heating the washing water, a filter assembly 50 that filters ("filtering") the washing water, and a sterilizing unit 101 coupled to the base plate 20 to sterilize the washing water.

The base plate 20 may form the lower surface of the washing chamber 11. In addition, the base plate 20 can support the tub 10. For example, the base plate 20 may space the tub 10 upward (or in the height direction) at a certain distance from the ground.

Meanwhile, a control box (not illustrated) may be provided inside the base plate 20 to control the operation of each component, such as the supply pump.

Figure 3:
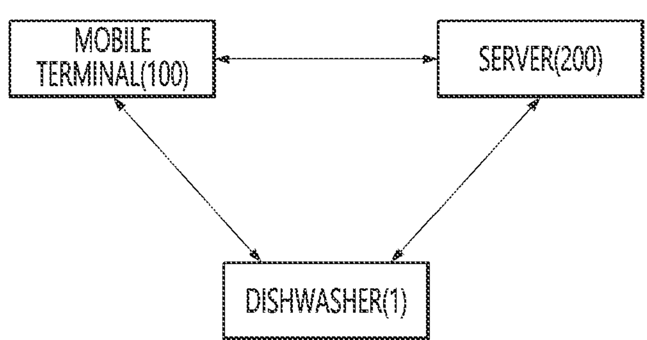
FIG. 3 is a diagram for explaining the configuration of a system according to an embodiment of the present disclosure.

FIG. 3 is a diagram for explaining the configuration of a system according to an embodiment of the present disclosure.

The system may include a dishwasher 1, a mobile terminal 100, and a server 200.

The mobile terminal 100 may transmit an image obtained by photographing the inside of the dishwasher 1 to the server 200.

The server 200 may obtain dish information based on the image received from the mobile terminal 100 and transmit the obtained dish information to the mobile terminal 100.

The mobile terminal 100 may generate guide information based on the received dish information and output the generated guide information.

The mobile terminal 100 may transmit a command to control the operation in a specific washing mode to the dishwasher 1 according to user input for guide information.

Figure 4:
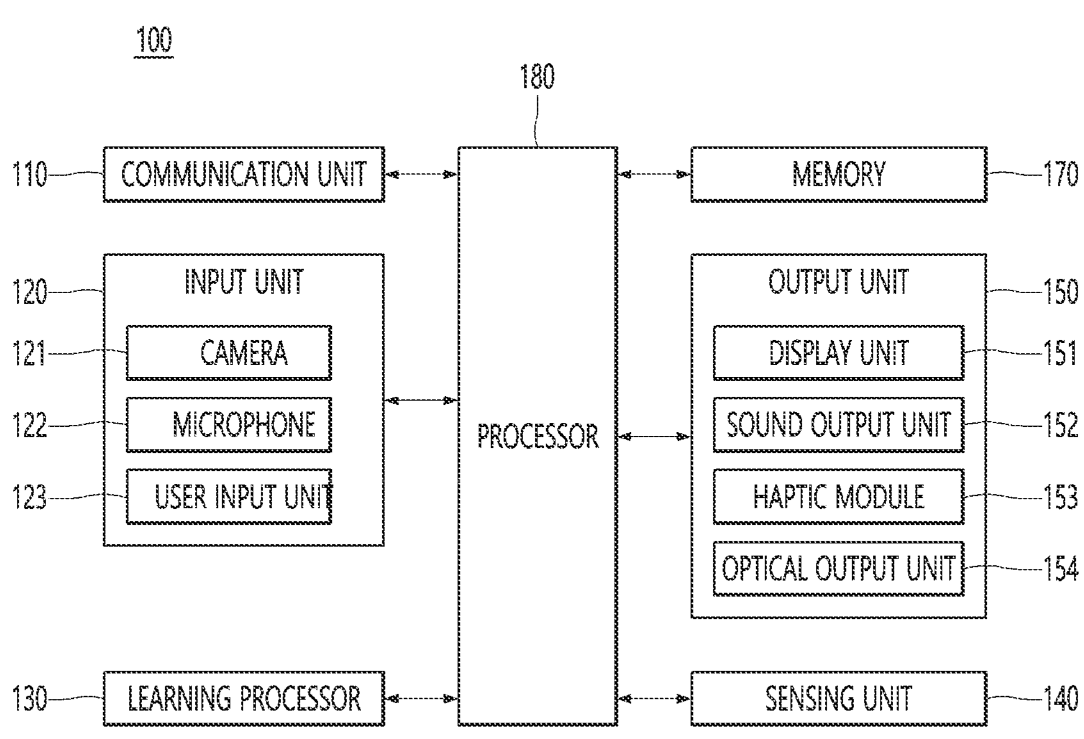
FIG. 4 is a block diagram for explaining the configuration of a mobile terminal according to an embodiment of the present disclosure.

FIG. 4 is a block diagram for explaining the configuration of a mobile terminal according to an embodiment of the present disclosure.

Referring to FIG. 1, the terminal 100 may include a communication unit 110, an input unit 120, a learning processor 130, a sensing unit 140, an output unit 150, a memory 170, a processor 180, or the like.

The communication unit 110 can transmit and receive data with external devices such as other AI devices 100*a* to 100*e* or the AI server 200 using wired and wireless communication technology. For example, the communication unit 110 may transmit and receive sensor information, user input, learning models, and control signals with external devices.

At this time, the communication technologies used by the communication unit 110 include Global System for Mobile communication (GSM), Code Division Multi Access (CDMA), Long Term Evolution (LTE), 5G, Wireless LAN (WLAN), and Wireless-Fidelity (Wi-Fi), Bluetooth™, Radio Frequency Identification (RFID), Infrared Data Association (IrDA), ZigBee, NFC (Near Field Communication), or the like.

The input unit 120 may obtain various types of data.

At this time, the input unit 120 may include a camera 121 for inputting video signals, a microphone 122 for receiving audio signals, and a user input unit 123 for receiving information from the user.

Here, the camera 121 or the microphone 122 may be treated as a sensor, and thus the signal obtained from the camera or microphone may be referred to as sensing data or sensor information.

The input unit 120 may obtain learning data for model learning, input data to be used when obtaining an output using the learning model, or the like. The input unit 120 may obtain unprocessed input data, and in this case, the processor 180 or the learning processor 130 may extract input features by preprocessing the input data.

The camera 121 processes image frames such as still images or moving images obtained by an image sensor in video call mode or photographing mode. The processed image frame may be displayed on the display unit 151 or stored in the memory 170.

The microphone 122 processes external acoustic signals into electrical voice data. The processed voice data can be utilized in various ways according to the function (or application program being executed) being performed in the mobile terminal 100. Meanwhile, various noise removal algorithms may be applied to the microphone 122 to remove noise generated in the process of receiving an external acoustic signal.

The user input unit 123 is for receiving information from the user, and when information is input through the user input unit 123, the processor 180 may control the operation of the mobile terminal 100 to correspond to the input information.

The user input unit 123 may include a mechanical input means (or mechanical key, such as a button, dome switch, jog wheel, jog switch, or the like positioned on the front surface/rear surface or side of the terminal 100) and a touch input means. As an example, the touch input means may consist of a virtual key, soft key, or visual key displayed on the touch screen through software processing, or may consist of a touch key placed in a portion other than the touch screen.

The learning processor 130 can train a model composed of an artificial neural network using learning data. Here, the learned artificial neural network may be referred to as a learning model. A learning model can be used to infer a result value for new input data other than learning data, and the inferred value can be used as the basis for a determination to perform an operation.

At this time, the learning processor 130 may perform AI processing together with the learning processor 240 of the AI server 200.

At this time, the learning processor 130 may include a memory integrated or implemented in the mobile terminal 100. Alternatively, the learning processor 130 may be implemented using the memory 170, an external memory directly coupled to the mobile terminal 100, or a memory maintained in an external device.

The sensing unit 140 may use various sensors to obtain at least one of internal information of the mobile terminal 100, information about the surrounding environment of the mobile terminal 100, and user information.

At this time, the sensors included in the sensing unit 140 include a proximity sensor, illuminance sensor, acceleration sensor, magnetic sensor, gyro sensor, inertial sensor, RGB sensor, IR sensor, fingerprint recognition sensor, ultrasonic sensor, light sensor, microphone, lidar, radar, or the like.

The output unit 150 may generate output related to vision, hearing, tactile sensation, or the like.

At this time, the output unit 150 may include a display unit that outputs visual information, a speaker that outputs auditory information, a haptic module that outputs tactile information, or the like.

The output unit 150 may include at least one of a display unit 151, a sound output unit 152, a haptic module 153, and an optical output unit 154.

The display unit 151 displays (outputs) information processed in the mobile terminal 100. For example, the display unit 151 may display execution screen information of an application running on the mobile terminal 100, or User Interface (UI) and Graphic User Interface (GUI) information according to the execution screen information.

The display unit 151 can implement a touch screen by forming a layered structure or being integrated with the touch sensor. This touch screen may function as a user input unit 123 that provides an input interface between the mobile terminal 100 and the user, and may simultaneously provide an output interface between the terminal 100 and the user.

The audio output unit 152 may output audio data received from the communication unit 110 or stored in the memory 170 in call signal reception, call mode or recording mode, voice recognition mode, broadcast reception mode, or the like.

The sound output unit 152 may include at least one of a receiver, a speaker, and a buzzer.

The haptic module 153 generates various tactile effects that the user can feel. A representative example of a tactile effect generated by the haptic module 153 may be vibration.

The optical output unit 154 uses light from the light source of the mobile terminal 100 to output a signal to notify that an event has occurred. Examples of events that occur in the mobile terminal 100 may include receiving a message, receiving a call signal, a missed call, an alarm, a schedule notification, receiving an email, receiving information through an application, or the like.

The memory 170 may store data supporting various functions of the mobile terminal 100. For example, the memory 170 may store input data, learning data, learning models, learning history, or the like obtained from the input unit 120.

The processor 180 may determine at least one executable operation of the mobile terminal 100 based on information determined or generated using a data analysis algorithm or a machine learning algorithm. Additionally, the processor 180 may control the components of the mobile terminal 100 to perform the determined operation.

To this end, the processor 180 may request, retrieve, receive, or utilize data from the learning processor 130 or the memory 170 and may control components of the mobile terminal 100 to execute an operation that is predicted or an operation that is determined to be desirable among the at least one executable operation.

At this time, if linkage with an external device is necessary to perform the determined operation, the processor 180 may generate a control signal to control the external device and transmit the generated control signal to the external device.

The processor 180 may obtain intent information regarding user input and determine the user's request based on the obtained intent information.

At this time, the processor 180 uses at least one of a Speech To Text (STT) engine for converting voice input into a character string or a Natural Language Processing (NLP) engine for obtaining intent information of natural language, so that the intent information corresponding to the input by the user may be obtained.

At this time, at least one of the STT engine or the NLP engine may be configured, at least in part, of an artificial neural network learned according to a machine learning algorithm. In addition, at least one of the STT engine or the NLP engine may be learned by the learning processor 130, learned by the learning processor 240 of the AI server 200, or learned by distributed processing thereof.

The processor 180 may collect history information including the operation contents of the mobile terminal 100, the user's feedback on the operation of the mobile terminal 100, or the like and store the history information in the memory 170 or the learning processor 130, or transmit the history information to an external device such as AI server 200. The collected historical information may be used to update the learning model.

The processor 180 may control at least some of the components of the mobile terminal 100 to run an application program stored in the memory 170. Furthermore, the processor 180 may operate two or more of the components included in the mobile terminal 100 in combination with each other in order to run the application program.

Figure 5:
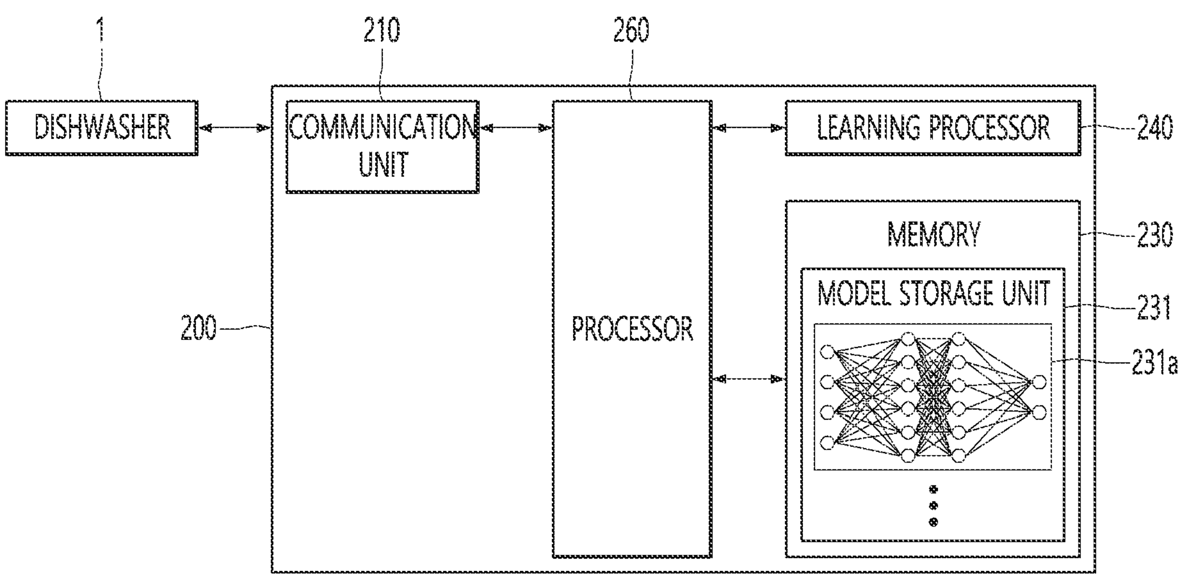
FIG. 5 is a block diagram for explaining the configuration of a server according to an embodiment of the present disclosure.

FIG. 5 is a block diagram for explaining the configuration of a server according to an embodiment of the present disclosure.

The server 200 may be an artificial intelligence (AI) server.

Referring to FIG. 5, the AI server 200 may refer to a device that trains an artificial neural network using a machine learning algorithm or uses a learned artificial neural network. Here, the AI server 200 may be composed of a plurality of servers to perform distributed processing, and may be defined as a 5G network. At this time, the AI server 200 may be included as a part of the mobile terminal 100 and may perform at least part of the AI processing.

The AI server 200 may include a communication unit 210, a memory 230, a learning processor 240, a processor 260, or the like.

The communication unit 210 can transmit and receive data with an external device such as the mobile terminal 100.

Memory 230 may include a model storage unit 231. The model storage unit 231 may store a model (or artificial neural network, 231*a*) that is being learned or has been learned through the learning processor 240.

The learning processor 240 can train the artificial neural network 231*a* using training data. The learning model may be used while mounted on the AI server 200 of the artificial neural network, or may be mounted and used on an external device such as a mobile terminal 100.

Learning models can be implemented in hardware, software, or a combination of hardware and software. When part or all the learning model is implemented as software, one or more instructions constituting the learning model may be stored in the memory 230.

The processor 260 may infer a result value for new input data using a learning model and generate a response or control command based on the inferred result value.

Figure 6:
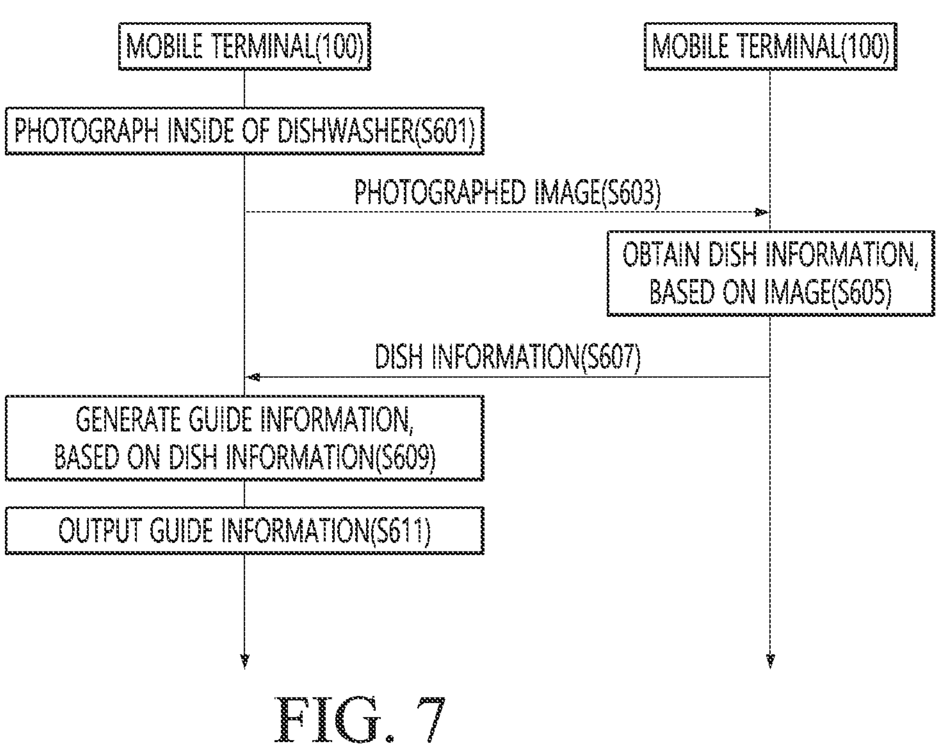
FIG. 6 is a ladder diagram for explaining a method for operating a system according to an embodiment of the present disclosure.

FIG. 6 is a ladder diagram for explaining a method for operating a system according to an embodiment of the present disclosure.

Referring to FIG. 6, the processor 180 of the mobile terminal 100 photographs the interior of the dishwasher 1 through the camera 121 (S601).

The user may take pictures of the washing chamber 11 of the dishwasher 1. The photographed image may include a plurality of tableware placed on a shelf.

The processor 180 of the mobile terminal 100 transmits the photographed image to the server 200 through the communication unit 110 (S603).

The processor 180 may transmit image data corresponding to the photographed image to the server 200 through the communication unit 110.

The processor 260 of the server 200 obtains dish information based on the image received from the mobile terminal 100 (S605).

In one embodiment, the dish information may include one or more of the type of tableware, the number of tableware, the posture in which the tableware is placed, the material of the tableware, the shape of the tableware, and the degree of contamination of the tableware.

The processor 260 of the server 200 may obtain dish information using a dish information inference model.

The dish information inference model may be a model for inferring one or more of the type of tableware, the number of tableware, the posture of the tableware, the material of the tableware, the shape of the tableware, and the degree of contamination of the tableware from image data.

The dish information inference model may be a model based on Faster Regions with Convolution Neural Networks (R-CNN), which will be described later.

The process of inferring dish information based on image data corresponding to the photographed image will be described with reference to the drawings below.

Figure 7:
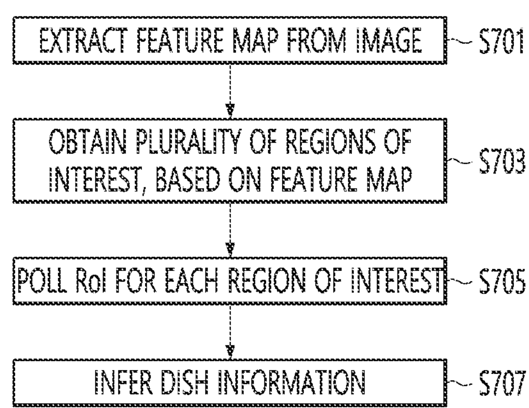
FIG. 7 is a diagram illustrating a method for inferring dish information according to an embodiment of the present disclosure.

FIG. 7 is a diagram illustrating a method for inferring dish information according to an embodiment of the present disclosure.

Dish information may be inferred using the Faster Regions with Convolution Neural Networks (R-CNN) model.

In the present disclosure, Fast R-CNN can be named a dish information inference model.

The embodiment of FIG. 7 may be performed by the learning processor 240 or processor 260 of the server 200.

When the Faster Regions with Convolution Neural Networks (R-CNN) model is stored in the memory 170 of the mobile terminal 100, the embodiment of FIG. 7 may also be performed by the processor 180 or the learning processor 130 of the mobile terminal 100. Accordingly, the mobile terminal 100 can independently infer dish information from the image without having to transmit the photographed image to the server 200.

The Faster Regions with Convolution Neural Networks (R-CNN) model may include all artificial neural network-based models that will be explained in FIG. 7.

Hereinafter, the description will be made assuming that inference of dish information is performed by the server 200 and the inferred dish information is transmitted to the mobile terminal 100.

Referring to FIG. 7, the processor 260 of the server 200 extracts a feature map from the image received from the mobile terminal 100 (S701).

The processor 260 may extract a feature map from the image 800 using a Convolution Neural Network (CNN) model. The processor 260 may use convolution to generate a feature map of the convolution layer from three-dimensional (width, height, color) data of the image.

Figure 8:
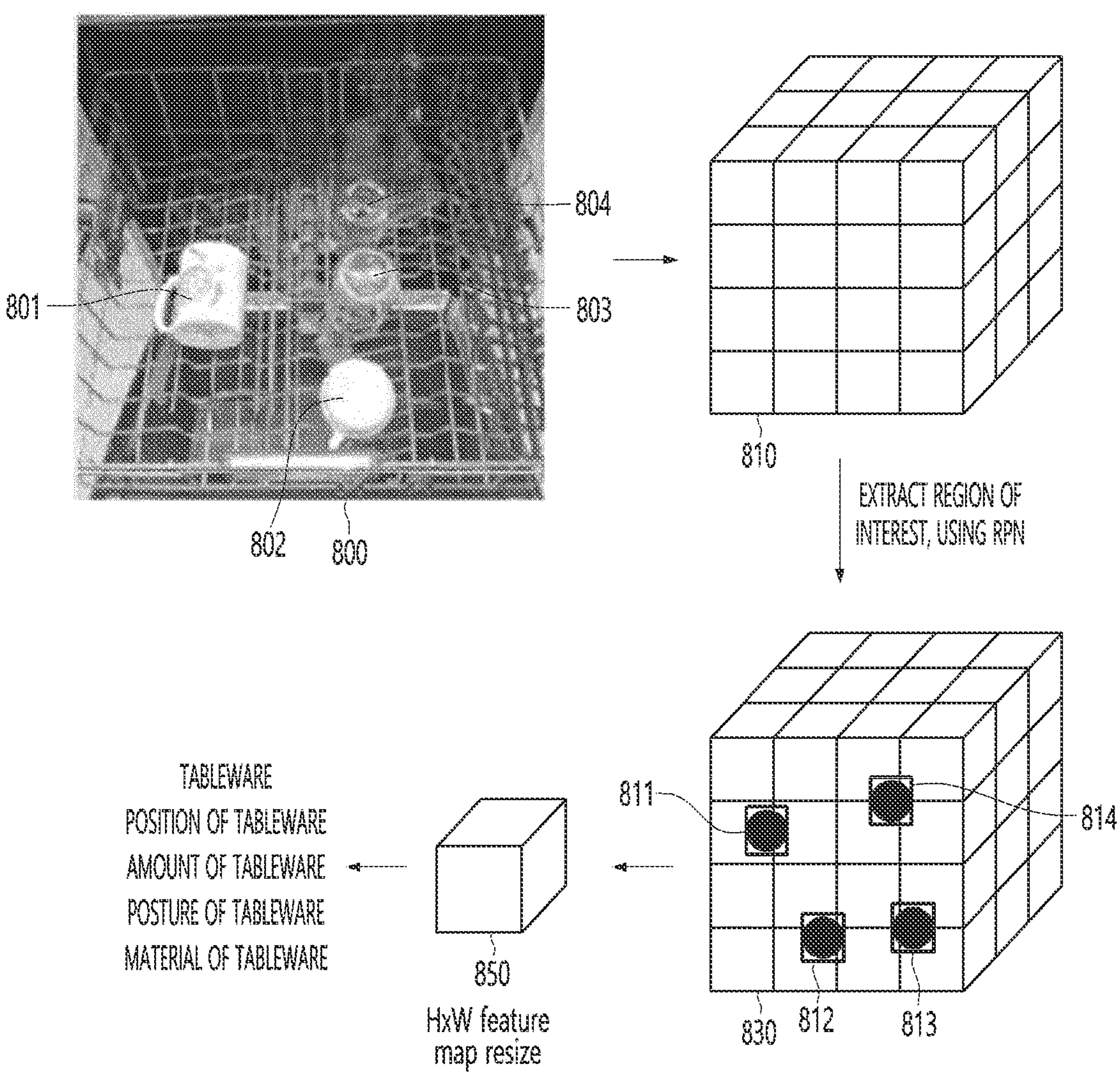
FIG. 8 is a diagram illustrating a process of extracting a feature map from an image and inferring the dish information from the feature map, according to an embodiment of the present disclosure.

FIG. 8 is a diagram illustrating a process of extracting a feature map from an image and inferring the dish information from the feature map, according to an embodiment of the present disclosure.

Image 800 may include four tableware 801 to 804.

The processor 260 may extract the feature map 810, which is the input/output data of the convolution layer as illustrated in FIG. 8, from the image 800 using a Convolution Neural Network (CNN) model.

The feature map 810 may be a matrix created by convolution calculation.

Again, FIG. 7 will be described.

The processor 260 of the server 200 extracts a plurality of regions of interest (RoI) based on the extracted feature map (S703).

The processor 260 may extract a plurality of regions of interest from the feature map using a Region Proposal Network (RPN) model.

Additionally, the processor 260 may extract the probability value (probability value of being an object) of each region of interest.

This will be explained with reference to FIG. 9.

Figure 9:
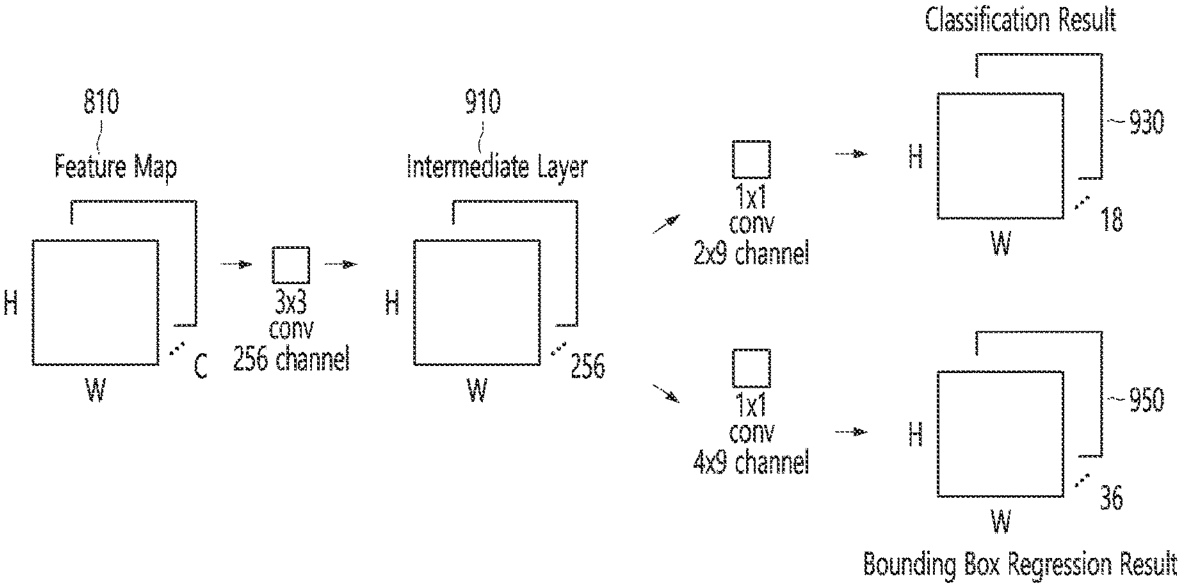
FIG. 9 is a diagram illustrating a process of extracting a plurality of regions of interest from a feature map using an RPN model, according to an embodiment of the present disclosure.

FIG. 9 is a diagram illustrating a process of extracting a plurality of regions of interest from a feature map using an RPN model, according to an embodiment of the present disclosure.

In FIG. 9, the process of extracting the region of interest through the feature map 810 may be performed by the RPN model.

Referring to FIG. 9, the processor 260 uses the feature map 810 of FIG. 8 as input and performs 3×3 convolution for 256 channels.

The size of the feature map 810 may be determined by width (W)×height (H)×number of channels C.

As a result of performing 3×3 convolution on the feature map 810, a second feature map 910 with a size of H×W×256 may be generated. This may correspond to the intermediate layer.

In order to perform classification, the processor 260 may perform 1×1 convolution on the second feature map 910 as many channels as 2 (the number of indicators indicating whether it is an object or not)×9 (the number of anchor boxes).

Classification may be a process of inferring the probability that the anchor box constituting the feature map contains an object or the probability that the object is a specific object. The model for this may be referred to as a classification model.

Accordingly, the processor 260 may obtain a feature map 930 with a size of H×W×18. One index on H×W may indicate a coordinate on the feature map 930, and the 18 channels below each use the corresponding coordinates as anchors and contain prediction values for whether each of the plurality of anchor boxes is an object.

In other words, prediction for H×W anchor boxes can be performed with one 1×1 convolution.

Meanwhile, the processor 260 may obtain the feature map 950 by performing 1×1 convolution for the number of (4×9) channels to obtain the Bounding Box Regression prediction value.

Bounding Box Regression may be an algorithm for correcting the position of the anchor box. The model for this may be referred to as Bounding Box Regression.

The anchor box may indicate a single square when the entire area of the image is divided into a plurality of defined squares.

The processor 260 may adjust the position of the anchor box by multiplying the vector extracted through the feature map 950 by the weight of a function that corrects the position of the anchor box.

The processor 260 may sort the probability values of being an object obtained through classification and then extract K anchors in descending order.

The processor 260 applies Bounding Box Regression to each of the K anchors.

Afterwards, the processor 260 can obtain RoI by applying Non-Maximum-Suppression. Non-Maximum-Suppression may be a process of leaving only the box having the highest score (probability value of being an object) and removing the remaining boxes when a plurality of anchor boxes are drawn on one object.

Obtaining RoI can be interpreted as obtaining the probability value and coordinate value of RoI.

The processor 260 may project the obtained RoI onto the feature map 810 and then apply RoI Pooling, which will be described later.

Again, FIG. 7 will be described.

The processor 260 of the server 200 performs RoI pooling for each region of interest (S705).

The processor 260 may project each region of interest onto the feature map 810 and then perform RoI pooling.

Referring to FIG. 8, it can be checked that a plurality of regions of interest 811 to 814 are projected on the feature map 810.

RoI pooling may be a process of setting the grid to fit predetermined H×W size of the feature map 830 on which the region of interest is projected and of extracting the feature map 850 with size H×W by extracting the largest value for each compartment included in each grid. A feature vector may be extracted through the extracted feature map 850.

The processor 260 of the server 200 infers dish information about the tableware positioned inside the dishwasher 1 based on the RoI performance result (S707).

Dish information may include the type of tableware and the position of the tableware.

Dish information may further include the number of tableware, the posture in which the tableware is placed, the shape of the tableware, the material of the tableware, and the mask area.

The processor 260 may infer the type of object (tableware) by applying a classification model using the feature vector extracted in step S705 as input.

The processor 260 may infer the position (coordinate information) of the object (tableware) by using the feature vector extracted in step S705 as input and applying the Bounding Box Regression model. The position of an object can be expressed as coordinate information of the area of interest.

Additionally, the processor 260 may obtain regions of interest within the image as mask regions.

The mask area may be an area where a certain standard for pixel values is applied to two-dimensional image data.

The processor 260 may infer the amount of tableware using the extracted feature vector as input and a dish amount inference model.

The dish amount inference model may be a model that infers the amount of tableware using the feature vector of the feature map as input data by an artificial neural network based on deep learning or machine learning. The amount of tableware may be the number of tableware.

The processor 260 may infer the posture of the tableware using the posture of dish inference model using the extracted feature vector as input.

The posture of dish inference model may be a model that infers the posture of tableware using the feature vector of the feature map as input data by an artificial neural network based on deep learning or machine learning. The posture of the tableware may indicate the disposition state in which the tableware is placed on the shelf. The posture of the tableware may include the angle at which the tableware is tilted.

The processor 260 may infer the material of the tableware using the extracted feature vector as input and a dish material inference model.

The dish material inference model may be a model that infers the material of tableware using the feature vector of the feature map as input data by an artificial neural network based on deep learning or machine learning. The material of tableware may represent components such as glass, plastic, aluminum, or the like.

Figure 10:
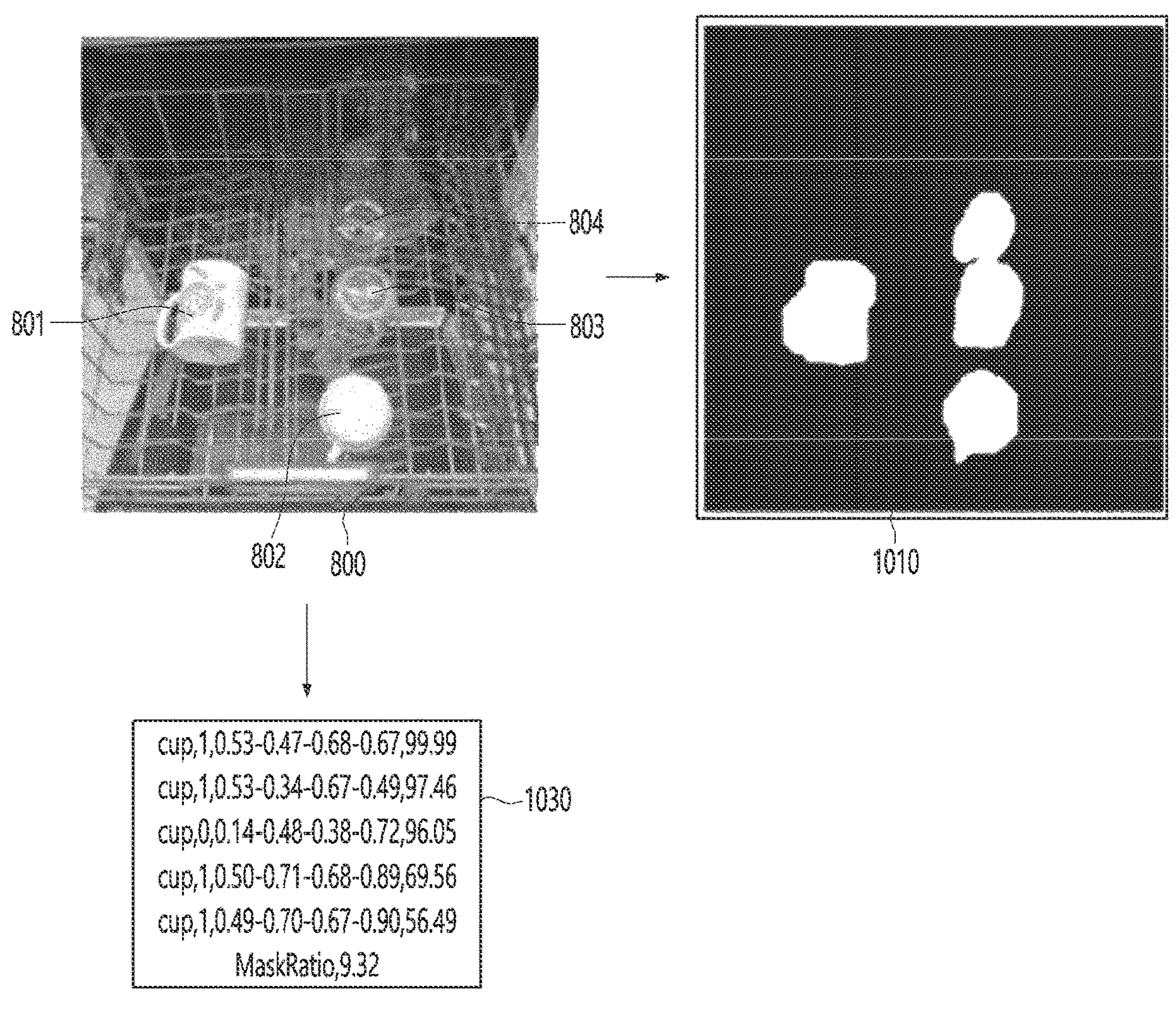
FIG. 10 is a diagram for explaining an example of extracting mask area and dish data from an image according to an embodiment of the present disclosure.

FIG. 10 is a diagram for explaining an example of extracting mask area and dish data from an image according to an embodiment of the present disclosure.

First, the processor 260 of the server 200 may divide the entire area 1010 of the image 800 into areas of interest (white areas) corresponding to the plurality of tableware 801 to 804 and background areas (black areas).

The processor 260 may obtain the region of interest as a mask area using the position information of the inferred region of interest.

The processor 260 may obtain dish data 1030 obtained through a classification model and a Bounding Box Regression model from the image 800.

The dish data 1030 may include the type of object included in each area of interest, the presence or absence of the object (0 or 1), the position of the object, the probability value predicting that the object is a specific type, and the mask ratio indicating the ratio of being occupied by the mask area compared to the entire area 1010, the posture of the object, the shape of the object, and the degree of contamination of the object.

The processor 260 may obtain the number of pixels in the mask areas compared to the number of pixels in the entire area 1010 as a mask ratio.

In the future, the mask ratio can be used to determine detergent input amount and washing course.

Dish data 1030 can be used to obtain dish information.

Again, FIG. 6 will be described.

The processor 260 of the server 200 transmits dish information to the mobile terminal 100 through the communication unit 210 (S607).

In response to receiving the image, the server 200 may transmit dish information containing information about the image to the mobile terminal 100.

The processor 180 of the mobile terminal 100 generates guide information based on the dish information received from the server 200 (S609).

The guide information may include one or more of a guide for the disposition of tableware, a guide for tableware that cannot be washed, a detergent input amount, and a washing course.

The processor 180 of the mobile terminal 100 outputs the generated guide information (S611).

The processor 180 can display guide information through the display unit 151 or output the guide information as a voice through the audio output unit 152.

Figure 11:
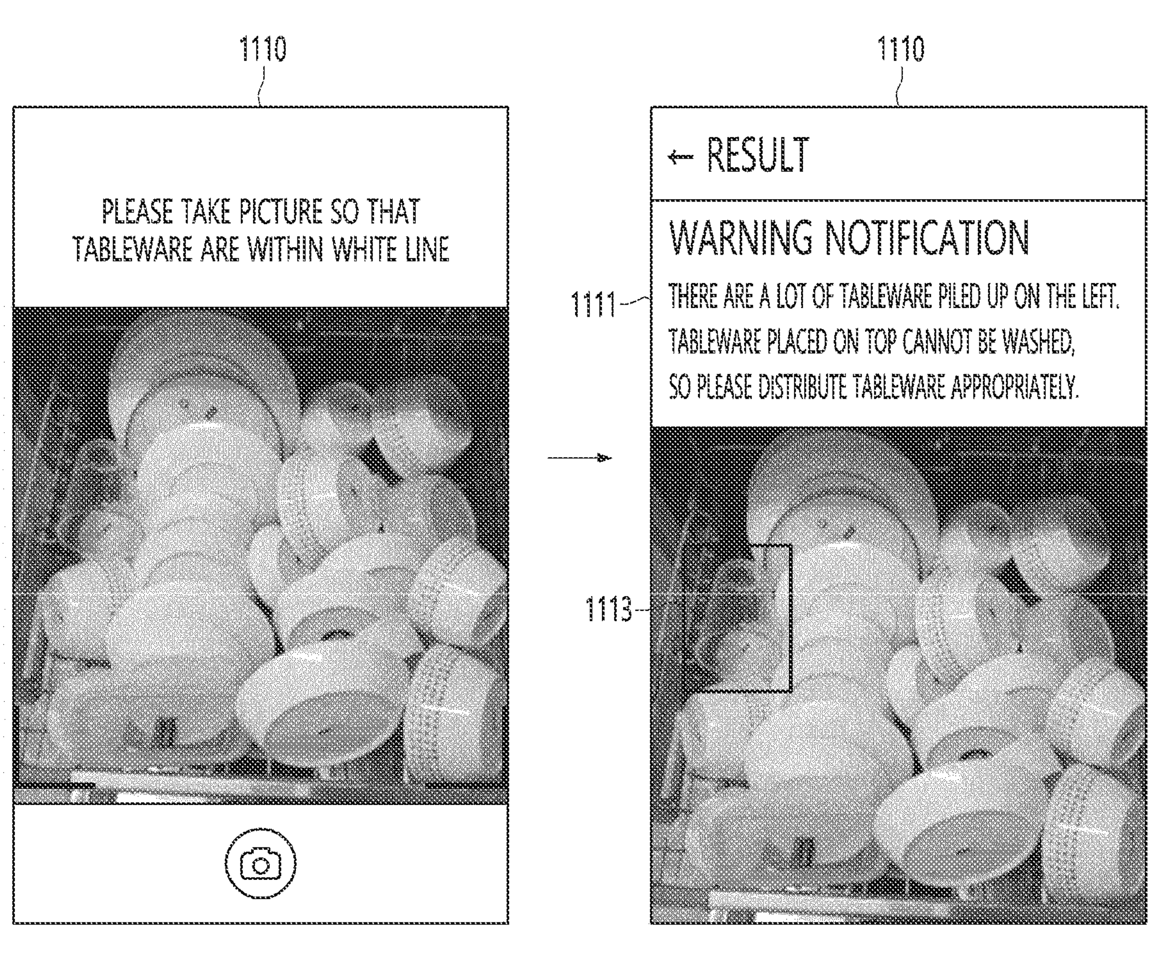
FIG. 11 is a diagram for explaining a process of guiding the disposition of tableware according to an embodiment of the present disclosure.

FIG. 11 is a diagram for explaining a process of guiding the disposition of tableware according to an embodiment of the present disclosure.

Users want to place tableware so that dirt on the tableware can be properly cleaned, but users do not know exactly how to place them so that they can be cleaned efficiently. To solve this problem, the present disclosure allows the user to take pictures of tableware with a mobile phone, informing the user of the state of storage of the tableware, and guiding the tableware that needs to be repositioned and their overall placement.

Referring to FIG. 11, the mobile terminal 100 displays a preview image 1100 photographed through the camera 121.

The mobile terminal 100 may have a dishwasher management application installed to manage the dishwasher. The mobile terminal 100 may turn on the camera 121 in response to execution of the corresponding application.

The mobile terminal 100 can guide the user through the UI when taking pictures so that the stored state of the tableware can be photographed at an accurate position (for example, please take pictures so that the tableware are within the white guide line).

The mobile terminal 100 may transmit the photographed image to the server 200 and receive dish information including the posture of the tableware and the position of the tableware from the server 200.

The dish information may include information indicating that the posture of the tableware in a specific position is placed in the posture that cannot be washed.

The mobile terminal 100 may display dish placement guide information 1110 based on the dish information.

When the posture of the tableware deviates from the preset posture, the mobile terminal 100 may display dish placement guide information 1110 to warn that the dish placement is incorrect.

The dish placement guide information 1110 may include a text 1111 to adjust the placement of one or more tableware in a specific position for normal washing of the tableware, and an indicator 1113 that identifies the position of the tableware whose placement needs to be adjusted.

Through the dish placement guide information, the user may determine the storage status of the tableware and receive guidance on the tableware that needs to be repositioned or the overall disposition.

Accordingly, tableware can be washed more efficiently and cleanly.

Figure 12:
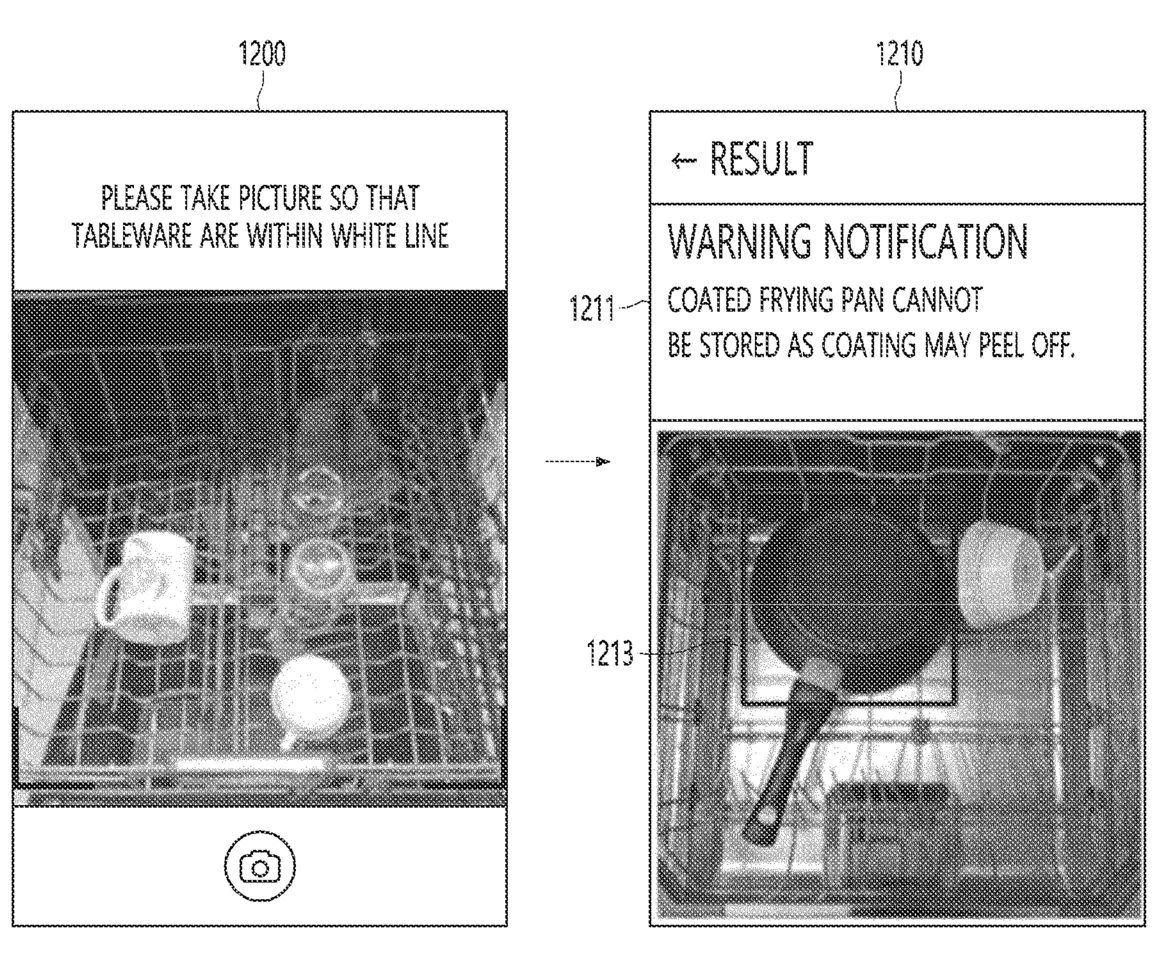
FIG. 12 is a diagram for explaining a process of guiding tableware that cannot be input, according to an embodiment of the present disclosure.

FIG. 12 is a diagram for explaining a process of guiding tableware that cannot be input, according to an embodiment of the present disclosure.

No user knows exactly whether plastic containers, coated frying pans, or the like can be placed in the dishwasher. To solve this problem, the present disclosure allows the user to store tableware in the dishwasher and then take a picture with a mobile phone to inform the user of tableware that cannot be stored.

Referring to FIG. 12, the mobile terminal 100 displays a preview image 1200 photographed through the camera 121.

The mobile terminal 100 may have a dishwasher management application installed to manage the dishwasher. The mobile terminal 100 may turn on the camera 121 in response to execution of the corresponding application.

The mobile terminal 100 can guide the user through the UI when taking pictures so that the stored state of the tableware can be photographed at an accurate position (for example, please take pictures so that the tableware are within the white guide line).

The mobile terminal 100 may transmit the photographed image to the server 200 and receive dish information including the type of tableware that cannot be washed and the position of the tableware from the server 200.

The mobile terminal 100 may display non-storage guide information 1210 based on dish information.

The mobile terminal 100 may determine whether there is tableware that cannot be washed based on the type of tableware and the material of the tableware included in the dish information, and if present, may create the position of the tableware and text indicating that the tableware cannot be washed.

The non-storage guide information 1210 may include text 1211 indicating that the tableware cannot be stored and an indicator 1213 that identifies the position of the tableware that cannot be stored.

Through the storage guide information, the user can check which tableware cannot be input in the dishwasher. Accordingly, damage to tableware that cannot be input may be prevented in advance.

Figure 13:
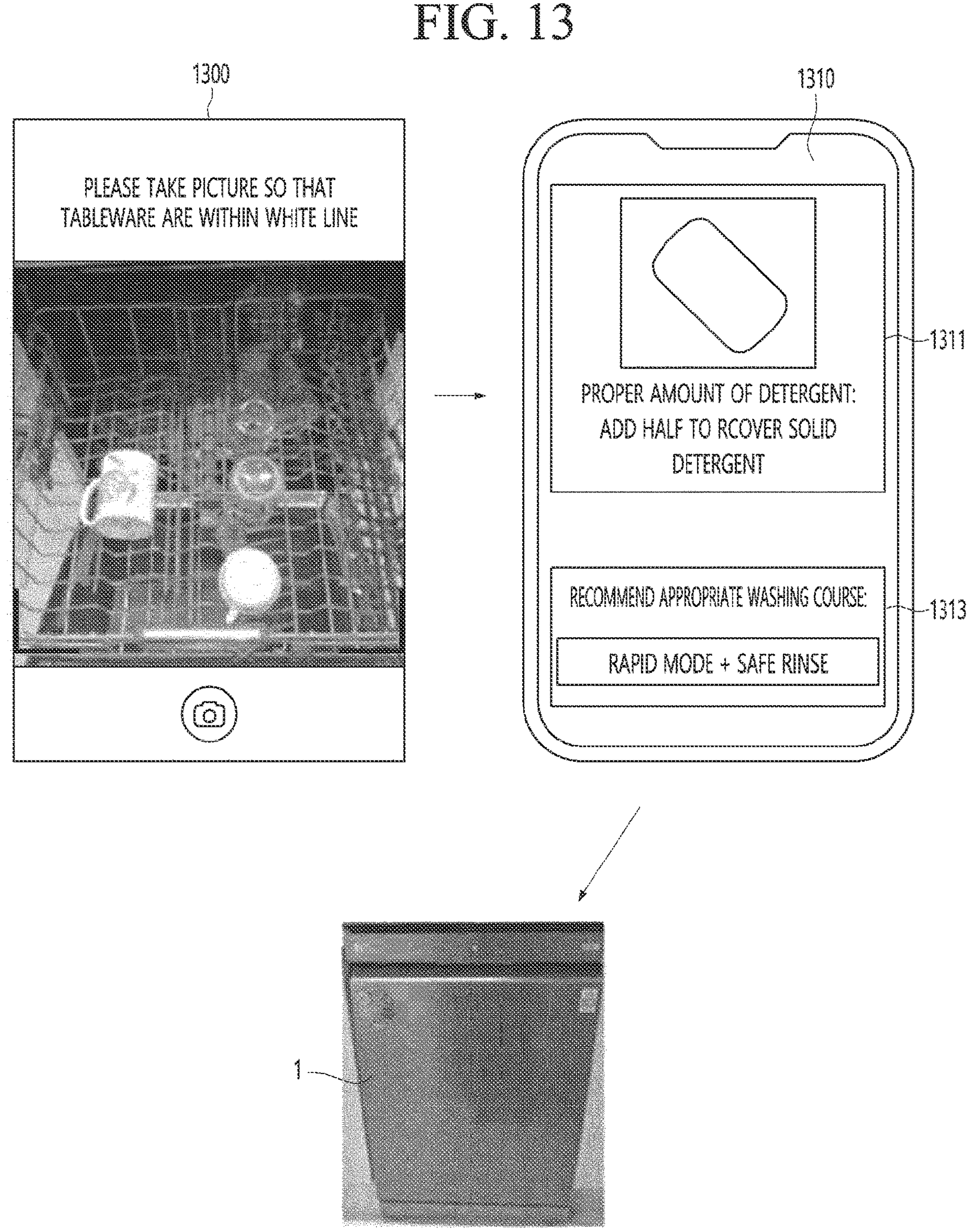
FIG. 13 is a diagram for illustrating a process of guiding the input amount of detergent and the washing course, based on a photographed image, according to an embodiment of the present disclosure.

FIG. 13 is a diagram for illustrating a process of guiding the input amount of detergent and the washing course, based on a photographed image, according to an embodiment of the present disclosure.

It is difficult for users to know the various dishwasher detergents on the market, the amount of dishwasher stored, and the appropriate amount of detergent according to the degree of contamination, and it is also difficult to know the appropriate washing course.

To solve this problem, the present disclosure may guide the user to the appropriate amount of detergent and washing course according to the dishwasher detergent used by the user, storage volume, and degree of contamination.

Referring to FIG. 13, the mobile terminal 100 displays a preview image 1200 photographed through the camera 121.

The mobile terminal 100 may have a dishwasher management application installed to manage the dishwasher. The mobile terminal 100 may turn on the camera 121 in response to execution of the corresponding application.

The mobile terminal 100 can guide the user through the UI when taking pictures so that the stored state of the tableware can be photographed at an accurate position (for example, please take pictures so that the tableware are within the white guide line).

The mobile terminal 100 may transmit the photographed image to the server 200 and receive dish information including the amount of tableware and the mask ratio from the server 200.

The mobile terminal 100 may display washing recommendation information 1310 based on the dish information.

Washing recommendation information 1310 may include guide information 1311 for an appropriate amount of detergent and a recommended washing course 1313.

When an input for selecting a recommended washing course 1313 is received, the mobile terminal 100 may transmit a command to the dishwasher 1 to operate with a washing course corresponding to the recommended washing course.

For example, if the washing course includes a quick mode and a safe rinse operation, the mobile terminal 100 may send a control command to operate the dishwasher in a quick mode and a safe rinse according to the input for selecting the recommended washing course 1313 to the dishwasher 1.

The mobile terminal 100 can determine the detergent amount and washing course using the mask ratio. The mask ratio can represent the area occupied by tableware compared to the total shelf area.

When the mask ratio is 1/2 or more, the mobile terminal 100 can determine the detergent amount as the basic amount and the washing course as the strong mode.

When the mask ratio is 1/2, the mobile terminal 100 can determine the detergent amount as the basic amount and the washing course as the standard mode.

When the mask ratio is less than 1/2, the mobile terminal 100 can determine the detergent amount as 1/2 of the basic amount and the washing course to rapid mode.

As another example, the washing chamber 11 of the dishwasher 1 may be divided into an upper compartment and a lower compartment.

When the area occupied by the tableware in the lower compartment is less than 1/2 and the area occupied by the tableware in the upper compartment is more than 1/2, the mobile terminal 100 may determine the washing course as an upper compartment partial washing mode.

Conversely, when the area occupied by the tableware in the upper compartment is less than 1/2 and the area occupied by the tableware in the lower compartment is more than 1/2, the mobile terminal 100 may determine the washing course as a lower compartment partial washing mode.

Each mode according to the washing course may have different dish contamination levels, washing order, water consumption, maximum temperature, and washing course time.

This will be described later.

Meanwhile, if contaminants that are difficult to wash, such as food, red pepper powder, or oil, are found on the tableware, a safe rinsing action may be added.

The mobile terminal 100 may additionally receive information about the contamination level of the tableware from the server 200 in response to the image transmission.

The server 200 can measure the contamination level using a contamination level inference model. The contamination level inference model may be a model that uses machine learning or deep cleaning to infer the contamination level of tableware using a feature vector obtained through a feature map as an input vector.

The mobile terminal 100 may determine to perform a safe rinsing operation when the contamination level of the tableware is equal to or higher than the standard contamination level.

Figures 14, 15:
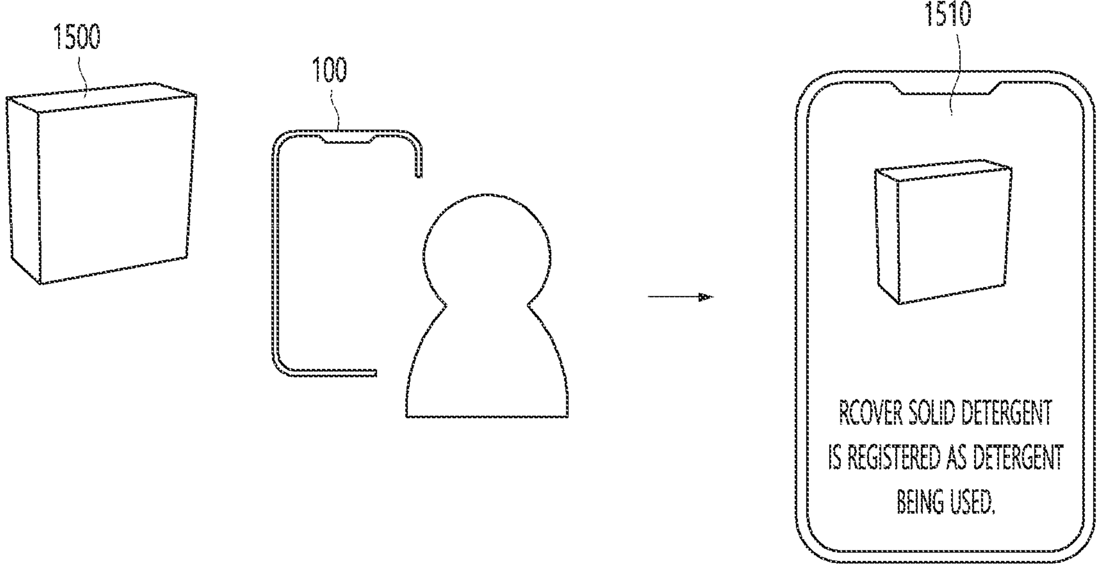
FIG. 14 is a diagram for explaining examples of various washing courses.
FIG. 15 is a diagram illustrating a process for checking the type of detergent according to an embodiment of the present disclosure.

FIG. 14 is a diagram for explaining examples of various washing courses.

The washing course (washing mode) may include soaking mode, standard mode, strong mode, delicate mode, rapid mode, and simple mode.

The cleaning sequence, water consumption, maximum temperature, course time, and contamination level can be matched to each mode.

Meanwhile, the amount of detergent input into the dishwasher may vary according to the type of detergent. Therefore, the type of detergent needs to be identified first.

FIG. 15 is a diagram illustrating a process for checking the type of detergent according to an embodiment of the present disclosure.

Referring to FIG. 15, the user photographs detergent 1500 through the mobile terminal 100 before photographing the inside of the dishwasher 1.

The photographed detergent image may be transmitted to the server 200, and the server 200 may transmit detergent information to the mobile terminal 100 through analysis of the detergent image.

Detergent information may include the name of the detergent and the amount of detergent used for each course.

Figure 16:
FIG. 16 is a diagram for explaining a process for guiding cleaning of a drain net of a dishwasher according to an embodiment of the present disclosure.

FIG. 16 is a diagram for explaining a process for guiding cleaning of a drain net of a dishwasher according to an embodiment of the present disclosure.

To check how much foreign matter is in the dishwasher's drain net, the user has to remove the lower compartment, turn the drain compartment, and open it to check, which is cumbersome and difficult to check when each wash is completed.

To solve this problem, the present disclosure can provide a notification to the user to empty the drain net when the drain net is somewhat full of food based on accumulated 3D image information.

The server 200 may store a plurality of images acquired each time the dishwasher 1 is used, as well as the contaminants, position of the contaminants, and volume of the contaminants obtained using machine learning.

When the volume of contaminants exceeds a certain amount, the server 200 may transmit information about the need for cleaning the drain net to the mobile terminal 100.

As illustrated in FIG. 16, the mobile terminal 100 may display drain net washing guide information 1600 based on information received from the server 200.

According to the drain net washing guide information 1600, the user can conveniently check the status of the drain net without the hassle of opening the drain compartment.

Figure 17A:
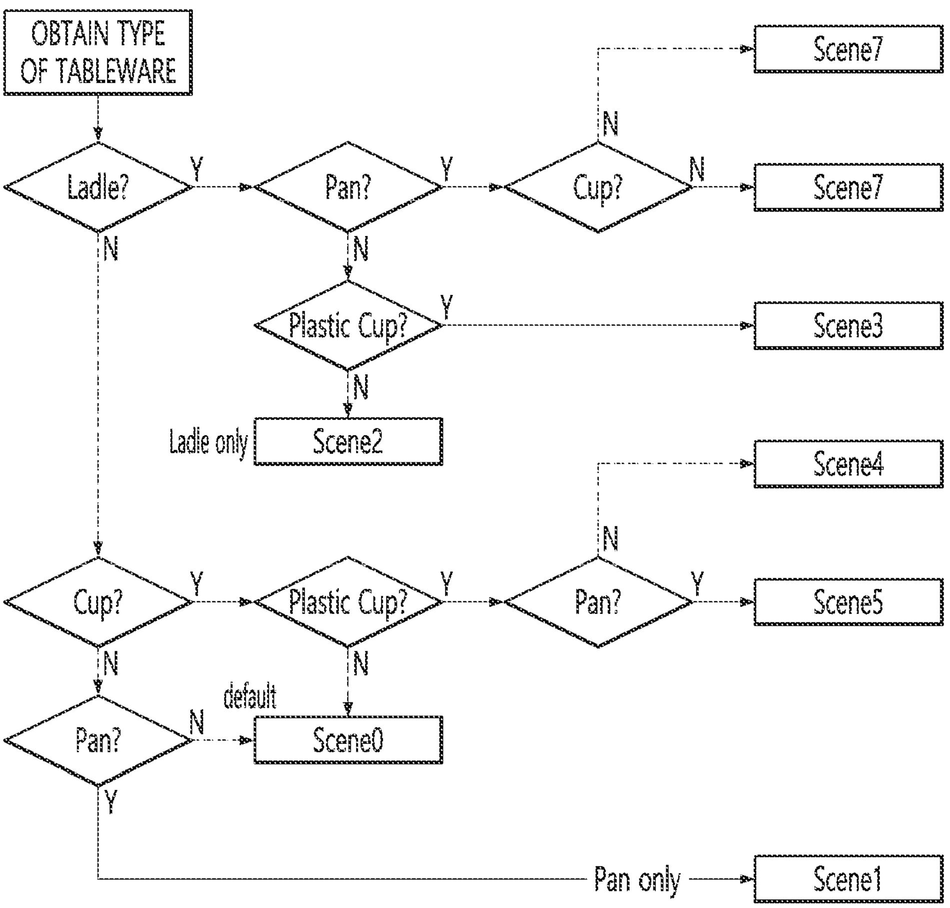

FIGS. 17*a* and 17*b* are diagrams illustrating a scenario for preventing damage to tableware and guiding a recommended course according to the type of the tableware.

First, the mobile terminal 100 may obtain the type of tableware based on the dish information received from the server 200.

If a ladle, plastic cup, or frying pan is not detected in the tableware, the mobile terminal 100 may output a notification recommending a standard course according to Scene 0.

If a ladle or plastic cup is not detected in the tableware, but a frying pan is detected, the mobile terminal 100 may output a guide to remove the frying pan according to Scene 1 and a notification recommending a small washing course.

The mobile terminal 100 may output a notification recommending a soaking course according to Scene 2 when a ladle is detected in the tableware, but a frying pan and a plastic cup are not detected in the tableware.

If a ladle and a plastic cup are detected in the tableware, but a frying pan is not detected, the mobile terminal 100 may output a guide to remove the plastic cup according to Scene 3 and a notification recommending a soaking course.

If a plastic cup is detected in the tableware, but a ladle or frying pan is not detected, the mobile terminal 100 may output a guide to remove the plastic cup according to Scene 4 and a notification recommending a low-temperature washing course.

If a plastic cup or frying pan is detected in the tableware, but a ladle is not detected, the mobile terminal 100 may output a guide to remove the frying pan according to Scene 5 and a notification recommending a low-temperature washing course.

If the ladle and frying pan are detected, but the cup is not detected, the mobile terminal 100 may output a guide to remove the frying pan according to Scene 6 and a notification recommending a soaking course.

If a ladle, frying pan, or cup is detected, the mobile terminal 100 may output a guide to remove the frying pan according to Scene 7 and a notification recommending a soaking course or standard course.

In this way, according to an embodiment of the present disclosure, a guide to remove tableware according to the type of tableware and a washing course according to the type of tableware may be automatically recommended.

Accordingly, damage to the tableware may be prevented in advance, and the tableware may be washed using the optimal washing course.

According to an embodiment of the present disclosure, the above-described method can be implemented as computer-readable code on a program-recorded medium. Computer-readable media includes all types of recording devices that store data that can be read by a computer system. Examples of computer-readable media include Hard Disk Drive (HDD), Solid State Disk (SSD), Silicon Disk Drive (SDD), ROM, RAM, CD-ROM, magnetic tape, floppy disk, optical data storage device, or the like.

The invention claimed is:

1. A mobile terminal comprising:
a display;
a camera; and
a processor configured to execute instructions to perform operations comprising:
obtaining, through the camera, an image of an inside of a dishwasher,
transmitting, to a server, the obtained image,
receiving, from the server, object information in response to the transmitted image, and
controlling the display to display washing guide information regarding the dishwasher based on the received object information,
wherein the object information includes at least one of a type of one or more objects, an amount of the one or more objects, a position of the one or more objects, a posture of the one or more objects, a material of the one or more objects, or a mask ratio indicating a ratio of the one or more objects to a total area of the image,
wherein the processor is configured to determine a washing course as a partial washing mode based on (i) an area occupied by the one or more objects in a first compartment of the inside of the dishwasher and (ii) an area occupied by the one or more objects in a second compartment of the inside of the dishwasher,
wherein the mobile terminal is configured to, based on (i) the area occupied by the one or more objects in the first compartment being less than one-half of the first compartment and (ii) the area occupied by the one or more objects in the second compartment being greater than one-half of the second compartment, determine the washing course as the partial washing mode,
wherein the processor is configured to, in response to the transmitted image, receive, from the server, detergent information, and
wherein detergent information includes a name of detergent and an amount of detergent used for each course.

2. The mobile terminal of claim 1,
wherein the operations further comprise controlling the display to, based on the posture of the one or more objects being deviated from a preset posture, display placement guide information including (i) the position of the one or more objects and (ii) textual instructions to adjust a disposition of the one or more objects.

3. The mobile terminal of claim 1,
wherein the operations further comprise controlling the display to, based on the type of the one or more objects and the material of the one or more objects indicating that the one or more objects cannot be washed, display non-storage guide information including the position of the one or more objects and textual instructions indicating that the one or more objects cannot be washed.

4. The mobile terminal of claim 1,
wherein the operations further comprise:
determining, based on the mask ratio, the amount of detergent for the dishwasher and the washing course, and
controlling the display to display washing recommendation information including the determined detergent amount and washing course.

5. The mobile terminal of claim 4,
wherein the operations further comprise transmitting, to the dishwasher, a command to execute the washing course, based on an input to select the washing recommendation information being received.

6. The mobile terminal of claim 4,
wherein the operations further comprise:
determining, based on the mask ratio being greater than 1/2, the detergent amount as a basic amount and the washing course as a strong mode,
determining, based on the mask ratio being 1/2, the detergent amount as the basic amount and the washing course as a standard mode, and
determining, based on the mask ratio being less than 1/2, the detergent amount as 1/2 of the basic amount and the washing course as a rapid mode.

7. The mobile terminal of claim 1,
wherein the operations further comprise controlling the display to display a guide line to guide photographing of the inside of the dishwasher according to an execution of the camera.

8. The mobile terminal of claim 1,
wherein the processor is configured to determine the washing course as a first partial washing mode based on (i) the area occupied by the one or more objects in the first compartment of the inside of the dishwasher being greater than one-half of the first compartment and (ii) the area occupied by the one or more objects in the second compartment of the inside of the dishwasher being less than one-half of the second compartment.

9. The mobile terminal of claim 1,
wherein the processor is configured to determine the washing course as a second partial washing mode based on (i) the area occupied by the one or more objects in the first compartment of the inside of the dishwasher being less than one-half of the first compartment and (ii) the area occupied by the one or more objects in the second compartment of the inside of the dishwasher being greater than one-half of the second compartment.

10. A system comprising:
a mobile terminal configured to:
obtain, through a camera, an image of an inside of a dishwasher,
transmit, to a server, the obtained image,
receive, from the server, object information in response to the transmitted image, and
provide, based on the received object information, washing guide information regarding the dishwasher; and
a server configured to:
receive, from the mobile terminal, the image,
obtain the object information from the image using an object information inference model based on regions with convolution neural networks (R-CNN), and
transmit, to the mobile terminal, the obtained object information,
wherein the object information includes at least one of a type of one or more objects, an amount of the one or more objects, a position of the one or more objects, a posture of the one or more objects, a material of the one or more objects, and a mask ratio indicating a ratio of the one or more objects to a total area of the image,
wherein the mobile terminal is configured to determine a washing course as a partial washing mode based on (i) an area occupied by the one or more objects in a first compartment of the inside of the dishwasher and (ii) an area occupied by the one or more objects in a second compartment of the inside of the dishwasher, wherein the mobile terminal is configured to, based on (i) the area occupied by the one or more objects in the first compartment being less than one-half of the first compartment and (ii) the area occupied by the one or more objects in the second compartment being greater than one-half of the second compartment, determine the washing course as the partial washing mode, wherein the mobile termina is configured to, in response to the transmitted, receive, from the server, detergent information, and wherein detergent information includes a name of detergent and an amount of detergent used for each course.

11. The system of claim 10, wherein the mobile terminal is configured to, based on the posture of the one or more objects being deviated from a preset posture, display placement guide information including (i) the position of the one or more objects and (ii) textual instructions to adjust a disposition of the one or more objects.

12. The system of claim 10, wherein the mobile terminal is configured to, based on the type of the one or more objects and the material of the one or more objects indicating that the one or more objects cannot be washed, display non-storage guide information including the position of the one or more objects and textual instructions indicating that the one or more objects cannot be washed.

13. The system of claim 10, wherein the mobile terminal is configured to:

based on the mask ratio, determine the amount of detergent for the dishwasher and the washing course, and display washing recommendation information including the determined detergent amount and washing course.

14. The system of claim 13, wherein the mobile terminal is configured to, based on an input to select the washing recommendation information being received, transmit, to the dishwasher, a command to execute the washing course.

15. The system of claim 13, wherein the mobile terminal is configured to:

based on the mask ratio being greater than 1/2, determine the detergent amount as a basic amount and the washing course as a strong mode, based on the mask ratio being 1/2, determine the detergent amount as the basic amount and the washing course as a standard mode, and based on the mask ratio being less than 1/2, determine the detergent amount as 1/2 of the basic amount and the washing course as a rapid mode.

16. The system of claim 10, wherein the mobile terminal is configured to display a guide line to guide photographing of the inside of the dishwasher according to an execution of the camera.

17. The system of claim 10, wherein the mobile terminal is configured to determine the washing course as a first partial washing mode based on (i) the area occupied by the one or more objects in the first compartment of the inside of the dishwasher being greater than one-half of the first compartment and (ii) the area occupied by the one or more objects in the second compartment of the inside of the dishwasher being less than one-half of the second compartment.

18. The system of claim 10, wherein the mobile terminal is configured to determine the washing course as a second partial washing mode based on (i) the area occupied by the one or more objects in the first compartment of the inside of the dishwasher being less than one-half of the first compartment and (ii) the area occupied by the one or more objects in the second compartment of the inside of the dishwasher being greater than one-half of the second compartment.

* * * * *